United States Patent
Steel et al.

(10) Patent No.: US 7,409,381 B1
(45) Date of Patent: Aug. 5, 2008

(54) INDEX TO A SEMI-STRUCTURED DATABASE

(75) Inventors: Samuel W. D. Steel, Colchester (GB); Udo Kruschwitz, Colchester (GB); Nicholas J. Webb, Colchester (GB); Anne N. De Roeck, Colchester (GB); Paul D. Scott, Cambridge (GB); Raymond Turner, Colchester (GB); Kwok C. Tsui, Colchester (GB); Wayne R. Wobcke, Ipswich (GB); Behnam Azvine, Ipswich (GB)

(73) Assignee: British Telecommunications public limited company, London (GB)

( * ) Notice: Subject to any disclaimer, the term of this patent is extended or adjusted under 35 U.S.C. 154(b) by 0 days.

(21) Appl. No.: 09/744,393

(22) PCT Filed: Jul. 30, 1999

(86) PCT No.: PCT/GB99/02517
§ 371 (c)(1),
(2), (4) Date: Mar. 5, 2001

(87) PCT Pub. No.: WO00/07117
PCT Pub. Date: Feb. 10, 2000

(30) Foreign Application Priority Data

| Jul. 30, 1998 | (GB) | ................................. 9816648.1 |
| Jul. 31, 1998 | (EP) | ................................. 98306106 |

(51) Int. Cl.
G06F 7/00 (2006.01)
G06F 17/30 (2006.01)
G06F 15/16 (2006.01)
G06F 17/20 (2006.01)
G06F 17/27 (2006.01)

(52) U.S. Cl. .......................... 707/3; 707/100; 707/200; 709/203; 704/1; 704/9

(58) Field of Classification Search ............... 707/1–10, 707/100–102, 104.1, 200–201; 704/9, 1; 709/203
See application file for complete search history.

(56) References Cited

U.S. PATENT DOCUMENTS 5,377,103 A   12/1994   Lamberti et al.

(Continued)

FOREIGN PATENT DOCUMENTS

EP   0268367 A   5/1988

(Continued)

OTHER PUBLICATIONS

Luniewski et al, "Rufus: Managing Semi-Structered Information", Almaden Computer Science Show and Tell, Almaden Research Center, San Jose, CA Oct. 4, 1994, XP002088419.

(Continued)

Primary Examiner—Miranda Le
(74) Attorney, Agent, or Firm—Nixon & Vanderhye P.C.

(57) ABSTRACT

A method and apparatus for generating an index entry for a record in a semi-structured database involves analysing each field to identify an entry within each field and to identify a sequence of characters having a format corresponding to a predetermined format. Thereafter, the method and apparatus operate to generate an index entry for the identified entry, and for at least one field, define any characters not identified as an entry as a free text entry.

6 Claims, 3 Drawing Sheets

U.S. PATENT DOCUMENTS

| | | | |
|---|---|---|---|
| 5,671,425 A | | 9/1997 | Suematsu |
| 5,727,196 A | * | 3/1998 | Strauss et al. .................. 707/2 |
| 5,799,268 A | * | 8/1998 | Boguraev ...................... 704/9 |
| 5,937,408 A | * | 8/1999 | Shoup et al. ................ 707/102 |
| 5,950,194 A | * | 9/1999 | Bennett et al. .................. 707/3 |
| 5,963,940 A | * | 10/1999 | Liddy et al. .................... 707/5 |
| 5,983,216 A | * | 11/1999 | Kirsch et al. ................... 707/2 |
| 5,987,447 A | * | 11/1999 | Chang et al. .................... 707/3 |
| 5,991,758 A | * | 11/1999 | Ellard ........................... 707/6 |
| 5,995,963 A | * | 11/1999 | Nanba et al. .................... 707/6 |
| 6,026,388 A | * | 2/2000 | Liddy et al. .................... 707/1 |
| 6,026,398 A | * | 2/2000 | Brown et al. .................... 707/5 |
| 6,026,410 A | * | 2/2000 | Allen et al. .............. 707/104.1 |
| 6,038,560 A | * | 3/2000 | Wical ............................ 707/5 |
| 6,052,693 A | * | 4/2000 | Smith et al. ............. 707/104.1 |
| 6,055,531 A | * | 4/2000 | Bennett et al. .................. 707/5 |
| 6,061,675 A | * | 5/2000 | Wical ........................... 706/45 |
| 6,070,158 A | * | 5/2000 | Kirsch et al. .................... 707/3 |
| 6,076,088 A | * | 6/2000 | Paik et al. ...................... 707/5 |
| 6,081,774 A | * | 6/2000 | de Hita et al. .................. 704/9 |
| 6,182,066 B1 | * | 1/2001 | Marques ........................ 707/5 |
| 6,216,123 B1 | * | 4/2001 | Robertson et al. ............... 707/3 |
| 6,243,713 B1 | * | 6/2001 | Nelson et al. ............ 707/104.1 |
| 6,298,343 B1 | * | 10/2001 | Chang et al. .................... 707/5 |
| 6,353,825 B1 | * | 3/2002 | Ponte ............................. 707/5 |
| 6,363,377 B1 | * | 3/2002 | Kravets et al. .................. 707/4 |
| 6,374,241 B1 | * | 4/2002 | Lamburt et al. ................ 707/6 |
| 6,421,662 B1 | * | 7/2002 | Karten ........................... 707/3 |
| 6,453,312 B1 | * | 9/2002 | Goiffon et al. .................. 707/3 |
| 6,457,014 B1 | * | 9/2002 | Parker ........................ 707/102 |
| 6,460,029 B1 | * | 10/2002 | Fries et al. ..................... 707/3 |
| 6,470,333 B1 | * | 10/2002 | Baclawski ...................... 707/3 |
| 6,470,334 B1 | * | 10/2002 | Umemoto ...................... 707/3 |
| 6,480,838 B1 | * | 11/2002 | Peterman ....................... 707/3 |
| 6,487,546 B1 | * | 11/2002 | Witkowski ..................... 707/1 |
| 6,513,031 B1 | * | 1/2003 | Fries et al. ..................... 707/3 |
| 6,519,597 B1 | * | 2/2003 | Cheng et al. .................. 707/10 |
| 6,584,459 B1 | * | 6/2003 | Chang et al. .................... 707/3 |

FOREIGN PATENT DOCUMENTS

| | | |
|---|---|---|
| EP | 50522591 A2 | 1/1993 |

OTHER PUBLICATIONS

Hammer et al, "Extracting Semistructured Information From the Web", Proceedings of the Workshop on Management of Semi-Structured Data, Proceedings of Workshop on Management of Semi-Structured Data, Tucson, AZ, May 16, 1997, pp. 18-25, XP002099172.

Frank Shou-Cheng Tseng et al, "Extending The E-R Concepts to Capture Natural Language Semantics of Database Access", Proceedings of the International Computer Software and Applications Conference, (COMPSAC), US, Los Alamitos, IEEE, Comp. Soc. Press, vol. Conf. 15, 1991, pp. 3035.

Huffman, et al, "Notes Explorer: Entity-Based Retrieval in Shared, Semi-Structured Information Spaces", Proceedings of the 1996 ACM CIKM International Conference on Information and Knowledge Management, Proceedings of 5th International Conference on Information and Knowledge Management, Rockville, MD. Nov. 12-16, 1996, pp. 99-106, XP002088420.

Kopec, et al, "Document Image Decoding Using Markov Source Models" Character Recognition Technologies, San Jose, CA, Feb. 1-2, 1993, vol. 1906, pp. 134-145, XP002088421.

Airi Salminen et al, "Form Text to Hypertext by Indexing", ACM Transactions on Information Systems, vol. 13, No. 1, Jan. 1995, pp. 69-99.

McHugh et al, "Lore: A Database Management system for Semistructured Data", Sigmod Record, US Association for Computing Machinery, New York, vol. 26, No. 3, Sep. 1, 1997, pp. 54-66, XP000701384.

* cited by examiner

| 51A | 51B | 51C |
| --- | --- | --- |
| 52A | 52B | 52C |
| 53A | 53B | 53C |
| 54A | 54B | 54C |

INDEX TO A SEMI-STRUCTURED DATABASE

FIELD OF THE INVENTION

The present invention relates to a method and apparatus for generating an index to a semi-structured database containing a number of items, each item comprising a set of data stored in a semi-structured format, each set of data including a number of related entries.

BACKGROUND OF THE INVENTION

Previously, there have been two major approaches to accessing data stored in electronic format. The first process is known as information retrieval and operates on a strict string search approach. Accordingly, if a user is to enter a query in the form of a keyword, using the information retrieval technique, the entire database will be searched for a string which matches the keyword. Obviously, such a system suffers from the drawback that it may well miss relevant entries should the form of the word in the database differ slightly to the form of the keyword. This problem can be overcome by using a stemming technique in which the keyword is truncated and a global word ending added. Again however this suffers from the drawback that numerous irrelevant records can then be located which include similar keywords.

In the second approach, known as knowledge representation, all the information from the database must be precoded using a special knowledge representation language to form a new database. This requires an operator to scan and analyse the data, placing relevant information in different knowledge representation fields. Once this has been completed, this allows users to access the information by entering queries in a knowledge representation language. This uses logic and theorem proving and is therefore not immediately accessible to users without specialised knowledge. In addition to this, knowledge representation approaches suffer from a drawback that the databases are initially hard to create and once created, even harder to change.

Both of the above mentioned techniques are anyway unsuitable for use with data stored in a semi-structured format. A semi-structured database is a database in which some of the data within the database is stored in specific fields which denote the type of data whereas the remainder of the data will simply be stored under a general field, such as a free text field.

Databases of this form are generally created by either scanning in hardcopy records having predetermined formats, or having an operator enter data manually. However, because of the versatility of free text type fields, the data entered may vary in content and style. Whilst this reduces restrictions on the data that can be entered, making the database easier to create, it does mean that the different types of data stored cannot be determined by identifying the field in which the data is stored. Examples of cases were data is stored in such a semi-structured format include the Yellow Pages® directory, Exchange and Mart, Loot, and The British National Formulary.

Thus, for example, in the Yellow Pages® directory, the headings of various sections will be stored in a record that is designated as a heading field. Each individual advert (hereinafter referred to as an item) will include a name field and a free text field. A name entry is stored in the name field, whereas a free text entry, such as a description of the companies products or services, an address entry and a telephone number entry, will all be stored in the same free text field.

Accordingly, if information retrieval were applied to the Yellow Pages® directory, a search for a keyword would search through all the headings, company names and the free text. As the type of data is not accounted for, a heading may be located as a relevant result, when in fact the items associated with that heading are the results required. On the other hand, a knowledge representation technique of searching the database, would require that the database be translated into a separate knowledge representation database which could then be searched using knowledge representation techniques. The original Yellow Pages® data would then be redundant, although if it were updated a new knowledge representation database would be required.

SUMMARY OF THE INVENTION

In accordance with the first aspect of the present invention, we provide a method of generating an index to a semi-structured database containing a number of items, each item comprising a set of data stored in a semi-structured format, each set of data including a number of related entries, the method comprising the steps of:

I) determining the presence of entries by comparing at least one set of data defining a respective item to each of a number of selection criteria, each selection criterion defining one or more predetermined characteristics of a respective entry; and, II) generating a set of indices representing a concordance between the entries determined in step (I) and the respective items.

In accordance with a second aspect of the present invention, we provide apparatus for generating an index to a semi-structured database containing a number of items, each item comprising a set of data stored in a semi-structured format, each set of data including a number of related entries, the apparatus comprising:

a processor which determines the presence of entries by comparing at least one set of data defining a respective item to at least one of a number of selection criteria, each selection criterion defining one or more predetermined characteristics of a respective entry;

an index generator which generates a set of indices representing a concordance between the entries determined by the processor and the respective items; and a data store which stores the set of indices.

The present invention provides apparatus and a method which generates an index to a semi-structured database. This involves defining a number of selection criteria which can be used to identify various entries in different fields of the semi-structured database. These selection criteria are then compared to the items of the database so that specific types of entry can be determined within each item. An index is then generated which indicates the determined entry and the location of the respective item within the database. It is then possible to utilise these indices when searching to locate relevant items. Because the indices have a structured format, this allows a more versatile and efficient searching technique to be used.

Typically at least one set of data includes at least a free text field having a number of entries stored as a sequence of alphanumeric characters, wherein the predetermined characteristic of at least one of the entries is the format of a number of the alphanumeric characters. Thus for example, in the case of a Yellow Pages® directory, each item will generally include a telephone number within the free text field. The telephone number will be expressed as a sequence of digits which can only have a limited number of formats. Accordingly, by comparing the entire free text field to a set of predetermined formats, the telephone number can be located. Alternatively, the phone number may be provided in a specific phone number, field or be identified by virtue of being defined in a different font to the remaining text.

Typically each set of data includes a name entry, the predetermined characteristic of the name entry being that it is located in a name field. However, it will be realised that this is not essential. A name entry may not appear for example in the Exchange and Mart directory, or adverts in Loot or other similar advertising magazines. Even if a name entry is present, this need not be located in a known field and may be identified by some other means, for example, the font of the text, or the like.

Typically the method further comprises, for at least one set of data, defining any data not determined as an entry in step (I) as a free text entry. Thus, by selecting the remaining data from, for example, the free text field, this allows any remaining words in a free text entry to be easily located. However, an alternative would simply be to compare the unmodified data to a list of keywords to locate any words that are believed to be relevant.

Typically the free text entry comprises at least one free text word defined by a sequence of alphanumeric characters. In this case, the method further comprises determining the presence of at least one selected free text word for a respective set of data by comparing the free text entry to at least one selection criterion defining one or more predetermined characteristics of a selected free text word; and, generating a set of indices representing a concordance between the selected free text words and the respective items.

Typically the predetermined characteristics of the at least one selected free text word comprise a predetermined list of words. This predetermined list of words may for example be a list of specific keywords. This allows selected words to be determined, such that words that would not be useful for searching, such as "the" for example, can be discarded. Alternatively however, the selection criterion could be such that only words which are verbs, nouns or adjectives are selected.

Typically the semi-structured database further comprises a number of heading fields each heading field preceding a number of related items and including at least one heading entry. In this case the presence of heading entries is determined by comparing each heading field to each of a number of selection criteria, each selection criterion defining one or more predetermined characteristics of a respective heading entry and generating a set of indices representing a concordance between the heading entries and the related items. This allows the headings of sections which may contain a number of related items to be searched. This is a more efficient searching technique as by identifying a relevant heading a large number of related items can easily be identified.

Typically at least one index in the set of indices indicates the location of an item within the semi-structured database having a respective entry determined in any of steps (I, IV, VI). It is also possible that at least one index in the set of indices indicates the location of each item within the semi-structured database having a respective entry determined in any of steps (I, IV, VI). Thus, each index may refer to one or more items depending on the format the indices are to take.

In accordance with a third aspect of the present invention, we provide method of identifying items contained in a semi-structured database having an index which has been generated according to any of the preceding claims, the method comprising the steps of:

A) generating a request for one or more items;
B) using the request and the set of indices to locate the one or more items within the semi-structured database; and
C) generating an output representative of the items.

In accordance with a fourth aspect of the present invention, we provide apparatus for identifying items contained in a semi-structured database having an index generated by apparatus according to any of the preceding claims, the apparatus comprising:

an input for receiving a request for one of more items;
a processing device which uses the request and the set of indices to locate the one or more items within the semi-structured database; and
an output which generates a signal representative of the items.

Accordingly, we further provide a method and apparatus for identifying items contained within a semi-structured database. This operates by using a keyword determined from a user input request. This keyword is then compared to the entries listed in the index generated according to the first or second aspects of the invention allowing relevant items to be located. The location of the item within the database is output, allowing the information within the item to be rapidly-retrieved.

When identifying items contained in a semi-structured database, the step of locating the one or more items will usually involve the steps of analysing the request and determining therefrom at least one keyterm representative of the requested items, comparing each keyterm with each index, selecting the indices for items which have entries including the or each keyterm and using the indices to determine the location of each respective item in the semi-structured database.

In accordance with a fifth aspect of the present invention, we provide a method of accessing a database in accordance with an input request for information, the method comprising the steps of:

a) parsing the request to determine the components of the request;
b) determining if the request includes any verb components forming a verb or verb group;
c) if the request includes any verb components:
  c1a) determining the position of the verb or verb group within the request and, determining any subject components representing the subject of the request and any object components representing the object of the request, using the position of the verb or verb group;
  and if the request includes no verb components:
  c1b) determining any components to be object components.
d) attempting to assign at least one component to a respective slot of a slot-and-filler request; and,
e) using the slot-and-filler request to access the database.

In accordance with a sixth aspect of the present invention, we provide apparatus for accessing a database in accordance with an input request for information, the apparatus comprising:

an input for receiving the request;
a parser which parses the request to determine the components of the request;
a slot filler which determines if the request includes any verb components forming a verb or verb group; and, if the request includes any verb components, determines the position of the verb or verb group within the request, and determines any subject components representing the subject of the request and any object components representing the object of the request using the position of the verb or verb group; and, if the request includes no verb components, the slot filler determines any components to be object components, and wherein the slot filler is adapted to assign at least one component to a respective slot of a slot-and-filler request; and, a query constructor which uses the slot-and-filler request for accessing a database.

The present invention therefore provides apparatus and a method which allows data to be accessed from a database in accordance with an input request for information. This involves parsing the request to determine the components of the request. The components of the request are then used to select which parts of the request contain useful information which should be used for accessing the database and which parts of the request contain redundant information which will not help locate relevant records. The useful information is then selected and assigned to a slot of the slot-and-filler request which can then be used to access the database.

Typically step a) includes the steps of:

a1) comparing each component to a predetermined hard word list to determine hard word components, the hard word components being assigned to the respective grammatical class;

a2) assigning any non-hard word components to be at least nouns;

a3) comparing each component to a predetermined verb list to determine verb components; and, a4) comparing each component to a predetermined preposition list to determine prepositional components.

However, any suitable method of parsing the request can be used. The above method is particularly advantageous as it is effectively a weak paser which does not necessarily operate to identify the exact word class of all the words in the request. Instead, as long as some sentence structure can be found this can be used for accessing the database. It will however be realised that a strong paser method may be used in some circumstances.

Typically step c1a) further comprises assigning any components following the verb or verb group to be object components and assigning any components preceding the verb or verb group to be the subject components. In this case, it is assumed that the sentence structure is essentially subject, verb and object. However other sentence structures may be assumed as appropriate, depending on the type of database used and the manner in which it is to be accessed. However, the above is particularly advantageous as it allows the components of the sentence to be easily identified.

Typically step c) further comprises the step of assigning any prepositional components to be modifier components. In many cases, in addition to the sentence having a subject, verb and object, there are a number of optional modifiers following the object clause of the sentence. The optional modifiers are usually in the form of prepositional phrases and these can be located by identifying prepositional components.

Preferably step d) further comprises, for at least one of the slots of the slot-and-filler request, comparing any modifier components to a number of respective slot criteria, and assigning any modifier component to the respective slot if it satisfies the slot criteria. This allows the optional prepositional components to be assigned to different slots in the slot and filler request. Thus, for example, the modifier components may include a reference to payment by a visa card. Accordingly, the slot criteria would be assigned to search for the term visa and assign this to a payments slot. It will be appreciated of course that the major limitations in the input user request will be defined by the subject, verb and object of the sentence. Accordingly, the modifiers may only be optionally used if the initial search locates too many documents and the input request is to be narrowed.

Typically step d) further comprises assigning any verb components to a respective slot of a slot-and-filler request. It will be realised however that for different databases different slots may be used. This will depend on the information which is to be extracted from the database and the information which is initially contained in the database.

Typically step d) further comprises deleting any components which are included on a predetermined list of components. This allows any components which do not add any information to the input request to be removed such that these terms do not have to be searched within the database. This reduces the amount of processing required to extract records from the database and helps reduce the number of irrelevant records which are found.

If no components can be assigned to a respective slot then the method typically further comprises modifying the input request and repeating steps a) to e) with the modified input request. This ensures that if no records are initially located the search can be modified until such records are located. Alternatively however a null result can simply be returned to the user and the process restarted.

Preferably, the at least one component is an object component. This is because, in the case of the Yellow Pages® directory, the object component usually contains the most useful information. Accordingly, it is preferable to use the object component in preference to any other components if only one component is to be used to retrieve information from the database.

When the database is a semi-structured database having an index generated in accordance with the first aspect of the present invention, the step e) preferably comprises the steps of:

e1) comparing each of the components assigned to a slot in the slot-and-filler request to one or more respective indices;

e2) selecting the indices for items which have entries including any of the components; and, e3) using the indices to determine the location of each respective item in the semi-structured database.

Typically the apparatus further comprises a store for storing a predetermined hard word list, a predetermined verb list and a predetermined preposition list, the store being coupled to the parser and the parser. The store further stores respective slot criteria for each slot of the slot-and-filler request, and wherein the slot filler compares any modifier components to the slot criteria, and assigning any modifier component to the respective slot if it satisfies the slot criteria. Although any suitable method of storing this information may be used.

BRIEF DESCRIPTION OF THE DRAWINGS

An example of apparatus according to the present invention will now be described with reference to the accompanying drawings, in which:—

DETAILED DESCRIPTION OF THE INVENTION

Figure 1:
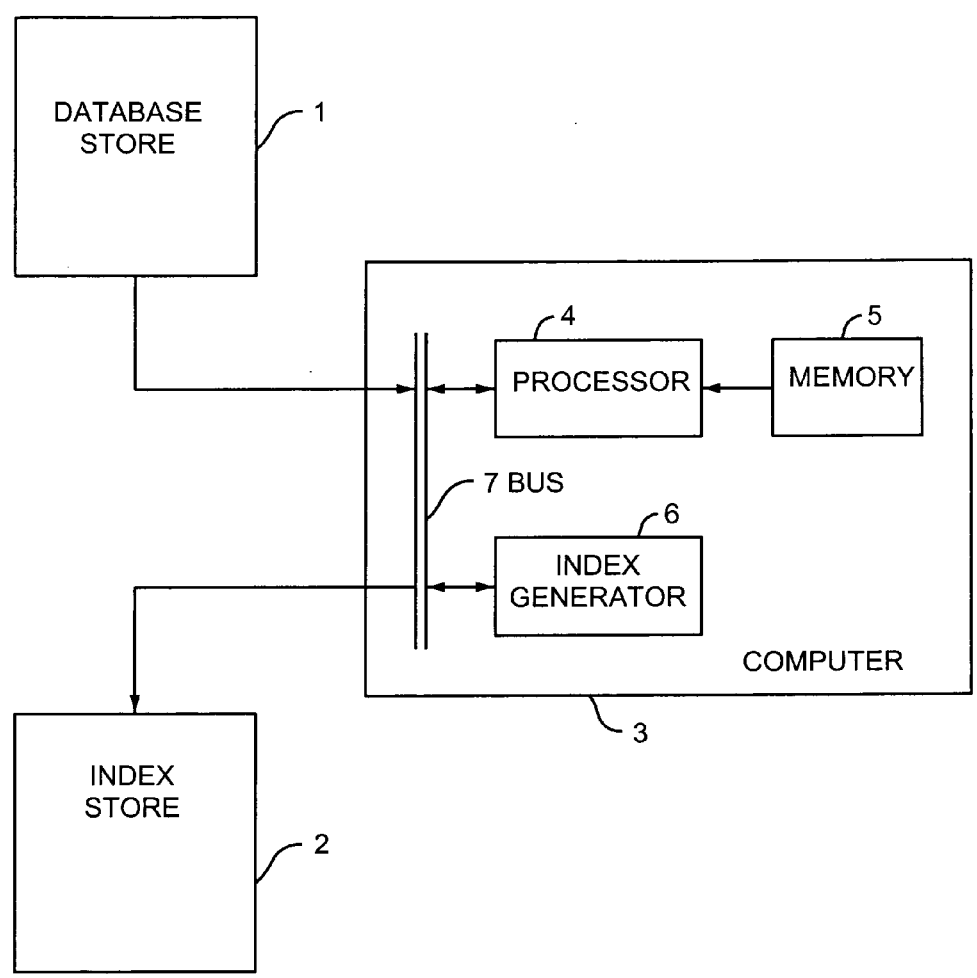
FIG. 1 shows in schematic form apparatus for generating an index to a semi-structured database.

Apparatus for generating an index to a semi-structured database will now be described with reference to FIG. 1. The apparatus comprises a database store 1, which stores the data forming the semi-structured database to be indexed, and an index store 2 which stores the generated index. The index store 2 and the database store 1 are coupled to apparatus 3 for generating the index which will generally consist of a computer such as a SUN SPARC5-175 station, or the like. This includes a processor 4 coupled to a memory 5 which stores a number of predetermined selection criteria. The processor 4 is also coupled to an index generator 6 via a bus 7.

Operation of the apparatus of FIG. 1 will now be described. The semi-structured database stored in FIG. 1 will generally include a number of items, each item being stored as a number of records. For example, in the case of the Yellow Pages® directory, each item 40 will generally comprise an individual advert, such as the advert shown in FIG. 2A. This typically includes a name field 41 including a name entry 42 and a free text field 43 including a free text entry 44, an address entry 45 and a telephone number entry 46.

Each item in the database store 1 is stored as a number of records 51,52,53,54 with each record corresponding to a separate line in the item. Each record indicates in a first portion 51A,52A,53A,54A the item to which the record relates. A second portion 51B,52B,53B,54B indicates the type of field of the data. Thus, in the present example the second portion 52B,53B,54B of the latter three records will indicate that the data is provided in the free text field 43 and these will therefore be identical, whereas the second portion of the first record 51B indicates that the data is provided in the name field 41. The final portion 51C,52C,53C,54C of the records contain the actual data, such as the name entry 42, the free text entry 44, the address entry 45 and the telephone entry 46.

In use, the processor 4 will access the database store 1 to obtain the records 51,52,53,54 relating to a single item 40. The processor will then access the memory 5 to obtain one of a number of selection criteria. This selection criterion will be compared to the records 51,52,53,54 to locate a respective one of the individual entries within the item 40, which satisfies the respective selection criteria.

Once the entry corresponding to the respective selection criteria has been determined, the data relating to that entry is extracted from the relevant record 51,52,53,54 and transferred to the index generator 6, along with an indication of the item with which the entry is associated. The index generator 6 then generates an index indicating the entry which was determined, and the item to which the entry relates. This is then transferred via the bus 7 to the index store 2. The processor 4 then accesses the memory 5 to obtain the next selection criterion.

Once each entry in the item has been indexed, the processor 4 accesses the database store 1 to obtain the next item in the database. The procedure is then repeated until all the items have been indexed.

Figure 3:
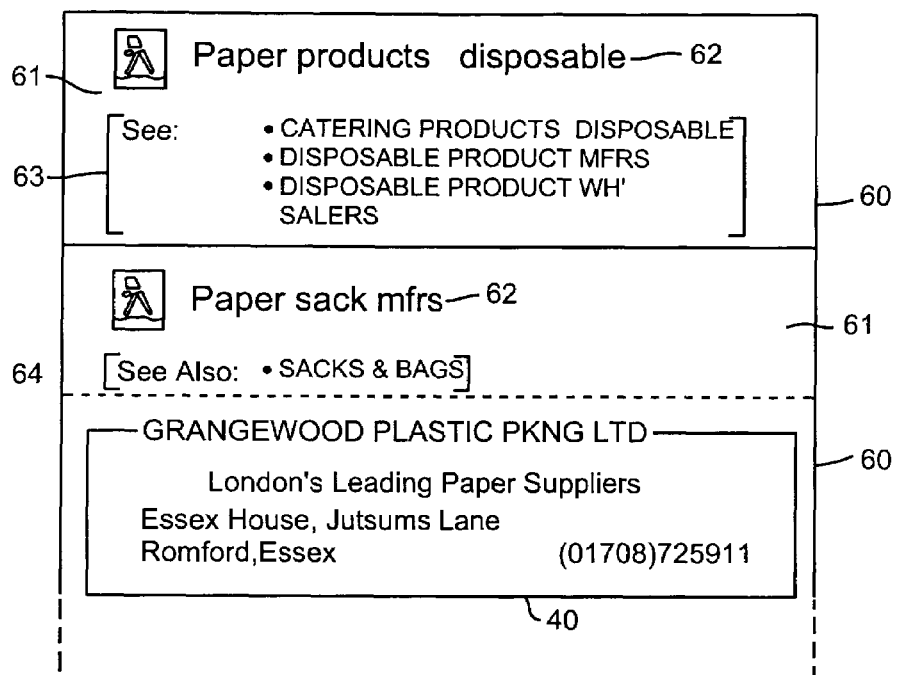
FIG. 3 shows typical heading, see-reference and see-also-reference entries from the Yellow Pages® directory; and, FIG. 4 shows in schematic form apparatus for requesting an item from a semi-structured database.

It will also be realised that in the Yellow Pages® directory, the items 40 are arranged into sections of related items. As shown in FIG. 3, each section 60 includes a heading entry 62 which is contained in a heading field 61. The heading entry indicates the nature of the related items and is provided with its own record.

Furthermore, there are also additional "see-reference" entries 63 and "see-also-references" entries 64 which may also be contained within the heading field 61 in respective records.

See-also-reference entries 64 are links to heading entries 62 of alternative sections 60 which may also include relevant items. See-reference entries 63 are again links to heading entries of alternative sections 60 that may include relevant items 40, however in contrast to the case of see-also-references entries, see-references entries are used when the section 60 including the see-reference entry does not in fact include any items. Accordingly, the heading entry, the see-also-reference entry and the see-reference entry are also transferred to the processor 4 for indexing.

In contrast to the indexing of items, each heading, see-reference and see-also-reference entry 62,63,64 does not include a specific item itself. Accordingly, once the processor 4 has located a heading entry, it must re-access the data stored in the database store 1 to determine which of the items are located in the respective section. Details of these items are then transferred to the index generator 6 which will generate an index for the respective heading entry, the index including a list of the relevant items in the respective section. This list will also include a link to the heading entry of alternative sections, if there are see-also-references or see-references present.

The selection criteria themselves must be defined using an in depth knowledge of the database and the format in which the data is entered.

Figures 2A, 2B:
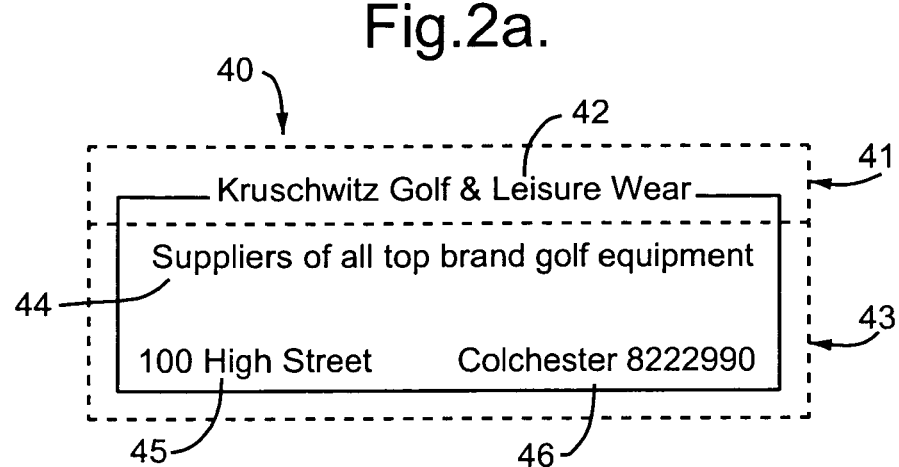
FIG. 2*a* shows a typical item from the Yellow Pages® directory.
FIG. 2*b* is a representation of the format of the data of the item of FIG. 2*a*.

For example, in the case of the item 40 shown in FIG. 2a, it is necessary to determine the presence of the name entry 42, the free text entry 44, the address entry 45, and the telephone number entry 46, as well as the heading entries. The procedure for achieving this will now be discussed separately for each entry.

Name Entry 42

This entry is readily identified as it is located in a specific name field and can therefore be identified by examining the record downloaded for the database store 1.

Telephone Number Entry 46

The location of telephone number entries 46 can be achieved by searching through the free text field 43 to locate a sequence of digits having a predetermined format. Thus, for example, in the item shown in FIG. 2A, the telephone number entry 46 is "Colchester 822990". Accordingly, the selection criterion for locating the telephone number entry 46 will be designed to look for a town name followed by a six digit number.

Alternatively however the respective search criterion will also be needed to search for a four digit area code followed by a six or seven digit number. It is also necessary to take into account that there may be different spacings between the digits in the phone numbers depending on the format used for entry of the telephone number. Accordingly, the search criterion which is used to locate telephone numbers preferably includes all possible telephone number formats, allowing any telephone number entry to be located.

Address Entry 45

Again, it is necessary to locate the address entry by comparing the free text entry to a number of likely formats for an address. Thus, in the example of FIG. 2a, the address entry 45 could be located by searching for a 3 or 4 digit number followed by a word and then the term "street". Analysis of addresses shows that many do in fact contain terms such as road, street, avenue, . . . etc and accordingly, all these terms may be included in the selection criterion which is used for determining address entries.

In addition to comparing the free text field for a term of this form and an address number, it is also possible to search for place names, such as Colchester. In this case such a search may not be successful as Colchester may have already been identified as part of the telephone number field 46. However, the aim is not to produce a single rule that will work for all items, but to produce a set of rules, each of which will be represented in the respective selection criterion, such that when the selection criterion is applied to the data, the relevant entry will be determined.

Free Text Entry 44

As far as the free text entry 44 is concerned, in the present example, this comprises the wording "suppliers of all top brand golf equipment". As this entry in itself is very difficult to locate, the processor 4 will determine the presence of a text entry 44 by firstly identifying and then ignoring all the other entries in the free text field 43.

As the Yellow Pages® directory format is such that the free text field 43 will only ever include a text entry 44, an address entry 45 and a telephone entry 46, once these entries have been determined, the remaining alphanumeric characters left in the free text field 43 must comprise a free text entry 44.

In the case of the free text entry 44, this includes a number of words. Extraction of all these words would not be particularly useful for searching purposes. Accordingly, it is preferable to be more selective in choosing the words which are used to form an index.

One possible approach is to select a limited number of words from the text entry to form a list of keywords. An index may then be generated for each keyword. Thus, in the present example, the free text entry 44 is "suppliers of all top brand golf equipment". In this case words such as "of" and "all" are, in themselves, not very useful, and would therefore be discarded. In contrast the words "supplier" or "golf" form very good keywords.

However, the problem of selecting keywords is increased by the fact that there is no sentence structure in the free text entry, and that the upper and lower case distinctions which are used by many lexical analysis programs tend to be meaningless in these items. A solution to this is to have a predetermined list of keywords which are to be selected. This is however somewhat limiting, and it is therefore preferred to select words on the basis of certain properties.

In the present example this is achieved by deleting all words that are not nouns, verbs, or adjectives. These words can easily be identified using a system such as the "Brill-Tagger" which takes lines of words as input and tags the words with a part-of-speech tag indicating the nature of the words.

An index is then created for:

i) any single word tagged as a noun;

ii) any compound consisting of two or three consecutive words (i.e. where no intermediate word has been deleted); and iii) noun compounds consisting of two or more words (these are indexed on the basis of any single word in the compound in combination with the 1st word).

The use of such compound keywords does have the limitation that many are too specific and may only relate to one item. This is overcome by deleting any compounds that are only associated with a single item.

As far as the remaining keywords and compounds are concerned, it is necessary to remember that there may be different varieties of the same word, such as golf, golfing, golfers. As a direct string comparison of golf and golfing will not produce a match, it is clearly preferable to modify the keyword or compound prior to forming the index.

Accordingly, the processor 4 accesses a lexicon such as "WordNet". This is used to convert any words located in the free text entry into their base form, such that golfing would be detected as golf. It is also possible to use stemmed forms of words, such as for example, "Lawnmow". This would then allow words such as lawnmowers, or lawnmowing to be detected.

A further alternative which needs to be considered when dealing with free text entries is the use of synonyms and hypernyms. These may be used to find words which are different but which have similar meanings. Thus for example a search for items relating to "teaspoons" may not locate very many records. However, if a search was carried out in the term "cutlery" then more records would be located. Accordingly, it is possible for the index to be created using more common synonyms or hypernyms of words to increase the number of relevant records that are located.

In some cases it is preferable to use a cyclic procedure to determine the free text entry. In this operation successive amounts of text are deleted from the free text field until the number and form of the compounds and keywords which are determined are acceptable.

Heading Entry 62

As mentioned above, the heading entry 62 is identified by virtue of it being located in a heading field 61. Once identified however, it is necessary to select one or more keywords from the heading. This is performed in a manner similar to that used for the free text entry using the Brill-tagger, WordNet and a stemming routine. It is also necessary to ensure that any abbreviations in the headings are identified and modified into a keyword. This can be achieved by identifying the abbreviations in advance and ensuring the lexicon can identify the base form of the respective word from the abbreviation.

Once the entries have been determined, the information is entered in the respective indices. These indicies are determined depending on the particular database used and the manner in which the database is to be accessed.

Thus, for example, if the database accessing technique involves the use of a single keyword, the search could be limited to desired indices, such as the list of name entry indices if the name of a company is known.

The present example uses an extension of this in which at least some of the indicies are advantageously determined to correspond to respective slots in a slot-and-filler request, the formation of which will be explained in more detail below. This means that the search term entered in a given slot need only be compared to the respective set of indicies associated with that slot, thereby reducing the amount of searching required, whilst allowing detailed searches to be performed.

In the present example, the slot-and-filler request includes Transaction; Goods; Location; Payment; Opening; and, Street slots.

Location and Street indicies are derived from the address entry. Accordingly, once the address entry has been determined and analysed, any details concerning a general location, such as the place name "Colchester", are stored in the Location index, whilst any details of street names are stored in the Street index.

The Payment, Opening and Goods indices are derived from the free text field. Thus, in the abovementioned example, the word "golf" would be determined and placed in the Goods slot. Similarly, words relating to payment methods, such as "Visa", "Cash" or "Credit Card" would be stored in the Payment slot, whilst opening hours are stored in the Opening slot.

Any entries which do not have any associated specific index are then entered into an index associated with the field from which they are derived. In the abovementioned example, a Name index, a Telephone number index and a complete Address index are therefore also provided. Similarly, any other entries in the free text field are placed in a Free Text index.

During the retrieval process, any search terms located in the Transaction field, which does not have an associated index, will then be searched against all the Free Text indices. Due to the manner in which the Goods search term is derived, it may also be advantageous to compare the Goods slot search term against the Free Text indices. However, as this may locate less relevant records, then the system can be configured to perform this search only if insufficient records are initially found.

As far as the a Name index, a Telephone number index and a complete Address index are concerned, these are utilized during retrieval of items, to allow the information contained in the item to be retrieved from the database. Optionally these could also be searched.

Once the indices have been defined, it is preferable to further define a set of ranking values indicating how relevant an item is to a particular index. This is achieved by determining the number of items that would be located using one specific index. In general, for the majority of indices, if a large number of items would be obtained, then each item has a relatively low ranking value indicating a relatively low relevance. In contrast, if only a small number of items are obtained for a particular index, these will have a high ranking value indicating that they are very relevant items.

The situation is further complicated by heading entries as each heading entry will refer to a number of related items, all of which are relevant. Accordingly, indices for heading entries are given a higher ranking value than those for the text entries.

In the case of see-reference entries, the heading entry to which they refer is considered as though the original request referred directly to that heading entry. See-also-reference entries are however ignored as the heading entries to which they refer are usually much more general than the heading entry under which the see-also reference occurs. Furthermore, there are often multiple heading see-also-references for any given heading entry.

It will however be realised that the calculation of ranking values is very much situation dependent, and the method employed will therefore vary for different semi-structured databases.

Figure 4:
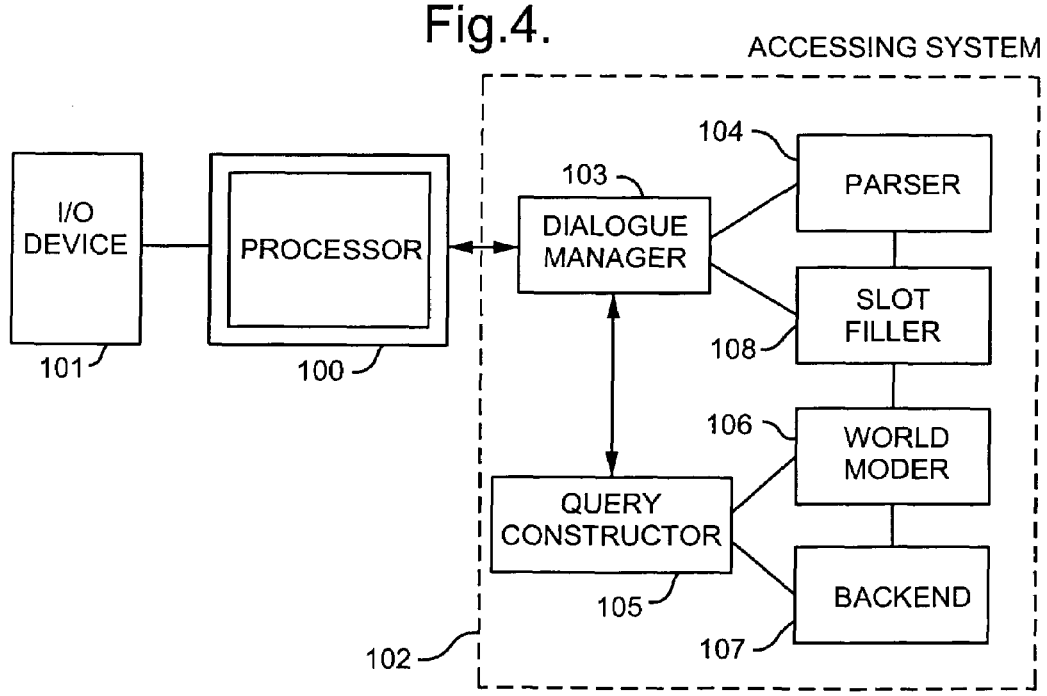

Apparatus for accessing the semi-structured database, using the generated indices, will now be described with reference to FIG. 4, which shows in schematic form a system architecture for accessing items from a semi-structured database. The system, which will generally be formed from a computer device, includes a processor 100 coupled to an input/output device 101. The input/output device 101 may be any form of input/output device such as a graphical user interface (GUI) and a keyboard, or a microphone and speaker coupled to a speech recognition/synthesizer circuit, or a combination of the two.

The processor 100 is also coupled to a database accessing system 102. The database accessing system 102 includes a dialogue manager 103 which is coupled to the processor 100. The dialogue manager 103 is also coupled to a parser 104, a query constructor 105 and a slot filler 108. Both the slot filler 108 and the query constructor 105 are coupled to a world model 106. The query constructor 105 is also coupled to a backend 107, which, in the present example, is formed from the apparatus according to FIG. 1 and therefore includes the semi-structured database store 1 and the index store 2.

In use, a request for information is input by a user using the input/output device 101. In the present example of the Yellow Pages® directory, the request is in the form of a natural sentence such as:

"I want a plumber for my boiler, who takes visa, in Ipswich".

The request is transferred via the processor 100 to the dialogue manager 103 which operates to keep track of the current stage of the request processing, as well as controlling the operation of the parser 104 and the query constructor 105.

From the dialogue manager, the request is passed to the parser 104 which parses the request so as to deconstruct the request into its component parts. The component parts are then described grammatically before being passed on to the slot filler 108. The slot filler 108 assigns the components to various slots in a so-called slot-and-filler request, as will be explained in more detail below. This slot-and-filler request is then transferred to the query constructor 105 via the dialogue manager 103.

The query constructor transforms the request into a database query using the world model 106 if necessary. The query constructor then accesses the index store 2 in the backend 107 to obtain the location of relevant items within the database store 1. Once located, the relevant items are transferred back to the dialogue manager 103 which determines whether the retrieved items are acceptable. Acceptable items are passed on to the processor 100 which generates an output, representative of the respective items, which is presented to the user using the input/output device 101.

In the event that too many or too few records are located, or the records located are unsuitable, then the dialogue manager 103 will operate to modify the slot-and-filler request obtained from the slot filler 108. This modification may be based either on grammatical modification or alternatively may be based on modifications indicated by dialogue between the user and the dialogue manager 103.

Once the slot-and-filler request has been modified, the querying of the database is repeated by the query constructor 105, as set out above.

Operation of the database system accessing 102 will now be described in more detail.

As mentioned above, a request input by a user is transferred to the dialogue manager 103, which analyses the request to determine if it is a request for data, or an alternative operational request, such as the quitting or restarting of the system, a help request from the operating system, or the correction of a previously entered request.

In the case of the correction of a previously entered request, the dialogue manager 103 will operate to modify the request, as will be explained in more detail below. For other operational requests, the dialogue manager instructs the processor 100 to carry out an appropriate operation such as providing help information, quitting or restarting the system.

In the case where the request is a request for information from the database, the dialogue manager 103 transfers the request to the parser 104.

Parser 104

As mentioned above, in this example, requests are input into the system in the form of a standard sentence. Thus, there is not necessarily a standard structure to the request and it is therefore necessary to determine the intended scope of the request by placing it in a form which the query constructor 105 can handle.

The first stage of this is to parse the sentence to deconstruct the sentence into its individual components. While a number of different parsing methods can be used, in the present example it is not necessary for the parse tree to be linguistically correct with the semantics and syntax of the sentence determined accurately. Instead the parser only needs to determine a structure that allows the search to be carried out. Accordingly, the parser is configured to operate as a weak parser which means that it is not necessary for the parser to identify the exact word-class of all the words in the request, as long as some form of parse tree can be found to represent the sentence.

If the result of the parsing process is unsuitable, this will have the effect of that no relevant records are found. In this situation the dialogue manager 103 will detect that the request was unsuitable and therefore provide feedback to the user to have the request clarified, as will be explained in more detail below.

In view of this, the parser uses a simple DCG like grammar and is implemented as a basic bottom-up chart parser, in the manner described below.

Firstly, the parser 104 scans the sentence to determine any hard words. Hard words are closed class words which can only fall into a single grammatical class and therefore includes words which can only act as a verb, or only as a noun, or only act as an adjective, or can only act as a preposition. These hard words are provided in a list which is stored in the form of a lexicon in a memory (not shown). Any other words which are not listed as hard words are automatically identified as soft words, meaning they can fall into anyone of a number of grammatical classes depending on the context in which the words are used. An example of this is the word "swim" which can be used as a noun or a verb. In this example, in order to maximise the amount of information obtained from the sentence, any word which is classed as a soft word is automatically identified as at least a noun.

The parser 104 then scans the sentence to determine any prepositions and any verbs.

This has the advantage that it allows the lexicon stored in memory (not shown) to be based on a list of prepositions, hard words and any verbs which are used by the associated database. This can limit the lexicon to include as few as 400 items thereby allowing the parser 104 to scan the request very quickly.

Once the sentence has been deconstructed and the relevant components identified, it is passed to the slot filler 108 in the form of a parse tree. This indicates, for each sentence component how it is analysed by the grammar.

An example of such a parse tree is given below in which the sentence, "I want a plumber for my boiler, who takes visa, in Ipswich" is deconstructed:

[s, [np, [pron,i], [vp, [v,want], [np, [det,a], [np, [n,plumber], [pp, [prep,for],[np, [det,my],

[np, [n,boiler], [relc, [rel,who], [np, [n,takes], [np, [n,visa], [pp, [prep, in], [np, [n, ipswich]]]]]]]]]]

where:
 (NP)=a noun phrase
 (VP)=a verb phrase
 (PP)=a prepositional phase
 (RELC)=a relative clause
 (PRON)=a pronoun
 (V)=a verb
 (N)=a noun
 (PREP)=a preposition
 (REL)=a relational term
 (DET)=a determinant Slot Filler 108

The slot filler then analyses the parsed sentence to determine the sentence structure. In this case, it is assumed that the sentence structure is essentially Subject, Verb, Object and (optional) Modifiers.

Accordingly, the first stage is for the slot filler 108 to identify the first verb, or verb group in the sentence. Verb groups will be identified by analysing the sentence to determine if there are multiple verbs. If not then there is no verb group. If however there are multiple verbs, the verbs will be compared to a list of known verb groups stored in the memory (not shown).

Once the verb or verb group is identified, everything in the sentence before the verb is determined to be the subject of the request and everything afterwards is determined to be the object and associated modifiers. Anything in the object which is identified to be a prepositional phrase is regarded as a modifier to the object.

Using this method, the above mentioned sentence "I want a plumber for my boiler, who takes visa, in Ipswich" is identified to have the following structure:
 Subject—I
 Verb—want
 Object—a plumber
 Modifiers—for my boiler, who takes visa, in Ipswich.

If a malformed input such as a lone noun phrase (for example, "parachuting centre") is input, this is assumed to be an object, with any associated modifiers. Such inputs will be identified by the lack of any verbs within the sentence.

The abovementioned analysis is, to a large extent, domain independent. This is because the analysis can be performed in the same way regardless of the database with which the system is to be used, although some minor modification of the lexicon may be required if the system is used in conjunction with an alternative database which uses substantially different verbs.

The broken down request then undergoes domain dependent analysis. This analysis is used to map parts of the sentence structure into various slots for searching the database. Accordingly, this analysis will depend on the database which is to be searched and the associated indices which have been generated. Thus, in this example, the mapping into various slots will be carried out so that the slots are suitable for searching the Yellow Pages® directory.

In this particular example, it is not usually necessary to know details of the sentence subject so this information is discarded. Furthermore, there are a number of words and/or phrases which typically do not convey any information in the Yellow Pages® such as "the", "and", "address", or "phone number" and searching by these words and/or phrases would not help locate relevant records. These words and/or phrases are referred to as stop words and a record of these is also stored in the lexicon in the memory (not shown). The deconstructed sentence is therefore scanned and any stop words are removed.

The next stage is to place individual words or phrases into the slots of the slot-and-filler request. In the present example of the Yellow Pages® directory the preferred slots used are transaction, goods, payment, opening, street and location.

The verb information maps directly to the transaction slot and the object information maps into the goods slot. Furthermore, the location slot can be readily filled by a simple search for known locations that are included within the database.

Thus, in the present example, this initially yields the following slot-and-filler request:
 Transaction—<empty>
 Goods—Plumber
 Location—Ipswich The transaction slot remains empty as the verb "want" does not convey any useful information and would therefore be removed as a stop word. However, if the sentence had included the verb "hire" for example, "I want to hire a car", then the transaction slot would include the word hire. The search would then be limited to hire companies.

As far as the payment, opening and street slots are concerned, this information is found almost exclusively within the object modifiers. Accordingly, each slot includes an associated series of predicates whose function is to scan the modifier fragment of the request looking for terms which are identified with specific slots.

The predicates are a set of rules which define whether a term should be incorporated into the respective slot. Accordingly, in this example, the predicate associated with the payment slot will search for words such as visa, delta, switch, credit card, access, cash, etc. Similarly, the street slot predicate will search for street names which can be recognized on the basis of their structure. Thus street names frequently take the form "X Crescent" or "X Road" where "X" is a name. Additionally, the identification of street names could be aided by including content in the database, for example by including the known street name "X", so that the streets can be identified directly on the basis of the name.

The predicates are, in this example, implemented in the Prolog programming language, although any suitable method of implementation could be used.

Once this has been completed, any additional modified information is placed in the goods slot. In the present example, this leads to the following slot-and-filler request:

Transaction—<empty>
Goods—Plumber & Boiler
Location—Ipswich
Payment—Visa
Opening—<empty>
Street—<empty>

It will be realised that the predicates can be adapted depending on the slot to be filled and the contents of the associated database.

The slot-and-filler request is then transferred via the dialogue manager 103, to the query constructor 105.

In order for the search to be successful, the slot-and-filler request will usually include at least one slot that must be filled in. In the present example, it is impossible to locate relevant records unless a search term is present in the goods slot. Accordingly, if the slot filler 108 determines that the goods slot is empty, then it returns the request to the dialogue manager 103. The dialogue manager then requests correction of the search term from the user so that a goods slot entry can be determined.

This may be achieved by indicating to the user that more information is required concerning what goods or services are required. The response, if in a one word form, can then simply be added to the goods slot. Alternatively, the request could be reprocessed in the usual way.

Query Constructor 105

The query constructor 105 uses the slot-and-filler request to access the backend 107 and determine a number of items which appear relevant to the slot-and-filler request. Thus, the query constructor 105 will access indices containing the keywords entered in the associated field of the slot-and-filler request.

In the present example described above, the query constructor 105 would access the appropriate indices in the index store 2 that include the keywords "plumber", "boiler", "Ipswich", and "Visa".

A list of any relevant items and their respective locations within the database store 1 is then returned to the query constructor 105 and passed onto the dialogue manager 103, which determines if the number of retrieved items is acceptable, or whether there are insufficient or too many matches.

If there are insufficient matches, the query constructor 105 then operates to broaden the scope of the request. This is achieved using knowledge obtained from the world model 106, which generally includes a lexicon (for example "Word-Net") including various synonyms, hypernyms, stemmed versions of words, and any other knowledge acquired by the user.

Thus, if the search results in too few matches, the query constructor 105 will access the world model 106 and determine a new keyword based on a synonym, hypernym or stemmed version of the original keyword. The search can then be repeated using the new more general keyword to obtain more results.

As an example, a query for teaspoons may not locate very many items. Accordingly, the query constructor 105 will access the world model 106 and determine that an equivalent word that could be used is cutlery. An enquiry for cutlery is then made with the backend 107, which will locate more items.

Alternatively, a slot entry of golfing could be stemmed to golf. However, to much stemming can result in the erroneous retrieval of irrelevant records, for example, if "hospitality" is stemmed to "hospital". Accordingly, it is preferable to use too little stemming too prevent irrelevant records being located, although should no records be located, the amount of stemming could be increased.

In the present example however there are no readily apparent alternatives that can be used. Accordingly, the dialogue manager 103 modifies the slot entries to broaden the search. This can be achieved using information about either the syntactics or the semantics of the slot.

Thus for example, the query constructor may choose to ignore any entries in the goods slot which are only located as part of a prepositional phase. In this case, this would involve removing the term "boiler" from the goods slot.

Alternatively, the dialogue manger 103 may choose to relax the search by ignoring some particular slots. Thus for example, if there is an entry in both the street slot and the location slot the dialogue manager would ignore the contents of the street slot to widen the search to a broader location.

In the event that a number of different options are available to the dialogue manager, the dialogue manager will generate an indication of the variety of options which are available. These are then presented to the user, via the input/output device 101, as a number of questions. This allows the user to control how the search is adapted.

Thus, for example, in the event that the query includes a request for a kitchen cupboard specialist in Ipswich, the dialogue manager may ask questions along the lines of:

1. Do you want to see matches in a wider area?
2. Should I search for kitchen specialists?
3. Should I search for cupboard specialists?

Once the results of these questions have been input, the dialogue manager 103 will modify the slot in the slot-and-filler request accordingly, by modifying or removing terms within the slot. The modified slots are then returned to the query constructor 105 which performs the updated search.

Similarly, if the request locates too many records, the dialogue manager 103 will operate to narrow the scope of the search. This can be achieved using more specific terms in the slots, as derived from the World Model 106, or by asking for further terms to be added to the search.

Alternatively, there may be some inconsistencies or unknown concepts within the search, in which case, the request is returned to the dialogue manager 103 for further revision.

Once a suitable number of items have been located, a list of items is transferred to the processor 100. The user can then use the ranking values of the respective items to determine the relevance of the located item. The user selects a number of items to be viewed and these are then downloaded from the database and output via the input/output device 101.

The invention claimed is:

1. Apparatus for accessing a semi-structured database in accordance with an input request for information, wherein the semi-structured database comprises a plurality of items, each item comprising one or more fields having a plurality of characters therein, at least one of the fields being a free text field, the apparatus comprising:

a processor;

means for accessing a data store comprising a plurality of index entries, each index entry representing a concordance between an entry in a field of an item in the semi-structured database and that item in the semi-structured database;

input means for receiving a request for information, the request comprising a natural language phrase;

a parser for parsing the received request to determine components of the request;

a slot filler for generating a slot-and-filler request having a plurality of slots, each slot corresponding to a group of index entries in said data store, the slot-filler being arranged to identify, one or more object components representing an object of the received request from the parsed request, and allocate at least one object component to a respective slot of a slot-and-filler request; and a query constructor for accessing the data store, wherein the query constructor is arranged to compare the or each allocated object component in the slot-and-filler request with a group of index entries in said data store corresponding to the slot of the allocated component, so as to identify an index entry corresponding thereto, and to use the identified index entry to identify a corresponding item in the semi-structured database;

an index generator comprising a processor arranged, in respect of each item in the semi-structured database, to analyze each field in accordance with a predetermined criterion so as to identify an entry within said field, and to generate at least one index entry representing a concordance between an identified entry and the item corresponding to the identified entry, and store the generated index entry in the data store;

wherein for each of a plurality of predetermined formats, the processor is arranged to search said free text field to identify a sequence of characters having a format corresponding to the predetermined format, said identified sequence of characters being deemed to constitute an identified entry;

wherein for the free text field, the processor is arranged to define any data not identified as an entry as a free text entry;

wherein the free text entry comprises at least one free text word defined by a sequence of alphanumeric characters, the processor being arranged to identify at least one selected free text word for a field by comparing the free text entry with at least one selection criterion defining one or more predetermined characteristics of a selected free text word.

2. Apparatus according to claim 1, wherein the items within the semi-structured database are further arranged in groups of items, each group being located in a heading field and being identified by at least one heading entry, wherein the processor is arranged to identify a heading entry by comparing each heading field with each of a plurality of selection criteria defining one or more predetermined characteristics of a respective heading entry, and is arranged to generate index entries representing a concordance between such heading entries and the group of items in the heading field.

3. Apparatus according to claim 1, wherein the slot filler is arranged to identify verb components forming a verb or verb group in the parsed request and to allocate any such identified verb components to a slot in accordance with a predetermined mapping between verb components and slots.

4. Apparatus according to claim 3, wherein the slot filler is arranged to identify any subject components in accordance with the position of the verb or verb group within the request and to allocate any such identified subject components to a slot in accordance with a predetermined mapping between subject components and slots.

5. Apparatus according to claim 3, wherein, in the absence of identifying verb components, the slot filler is arranged to deem any components to be object components.

6. Apparatus according to claim 1, wherein the data store is part of the apparatus.

* * * * *